Sheet 1 - 2 Sheets.

G. Notman.
Grain Binder.

N° 20215. Patented May 11, 1858.

Sheet 2-2 Sheets

G. Notman.
Grain Binder.

N° 20215     Patented May 11, 1858.

UNITED STATES PATENT OFFICE.

GEORGE NOTMAN, OF DEERFIELD, OHIO.

IMPROVED BINDING DEVICE FOR HARVESTERS.

Specification forming part of Letters Patent No. 20,215, dated May 11, 1858.

*To all whom it may concern:*

Be it known that I, GEORGE NOTMAN, of Deerfield, in the county of Portage and State of Ohio, have invented a new and Improved Raking or Gathering and Binding Device for Harvesters; and I do hereby declare that the following is a full, clear, and exact description of the same, reference being had to the annexed drawings, making a part of this specification, in which—

Figure 1:
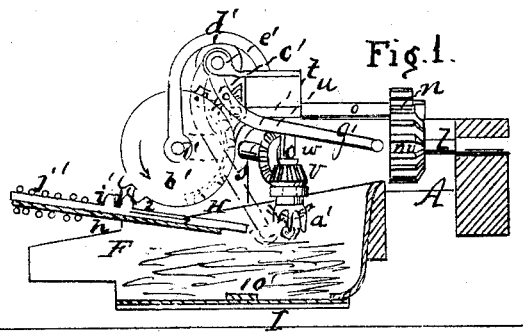
Figure 3:
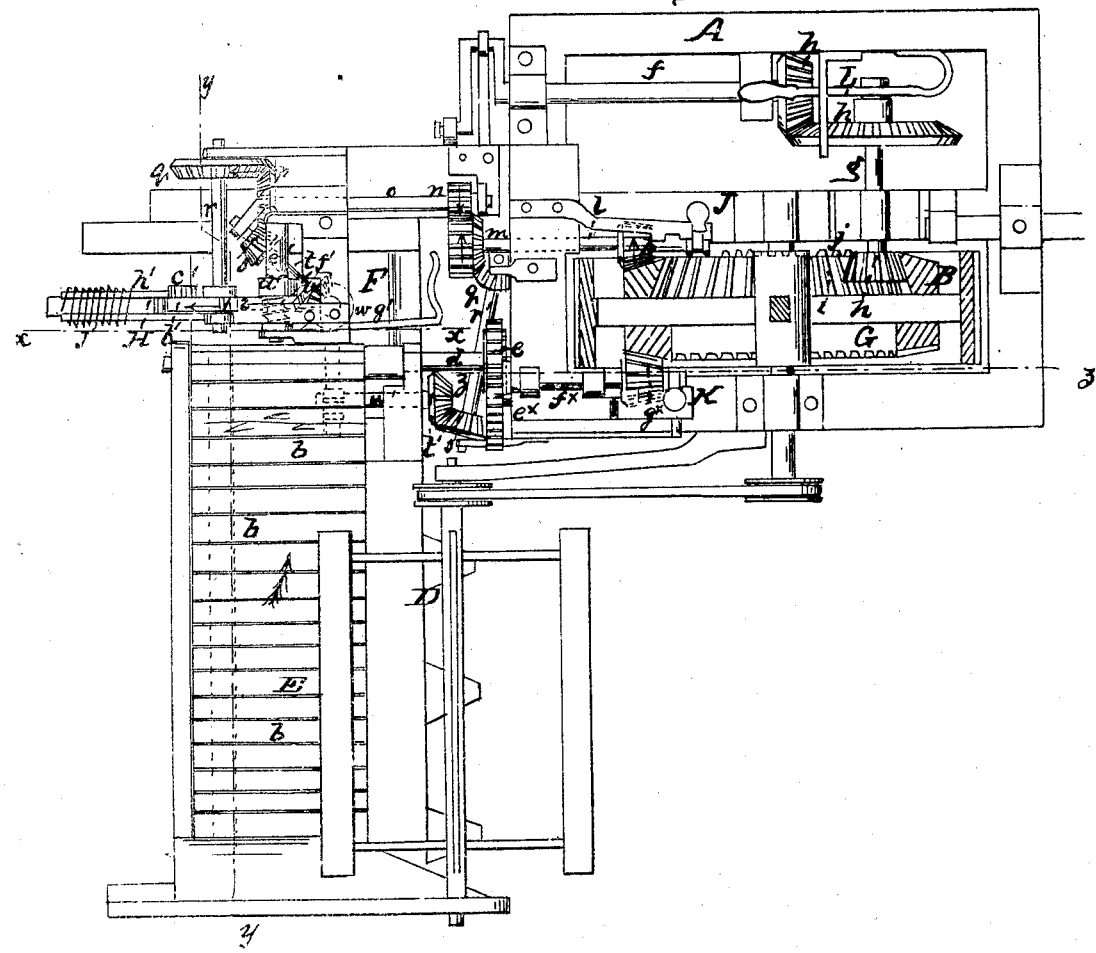
Figure 2:
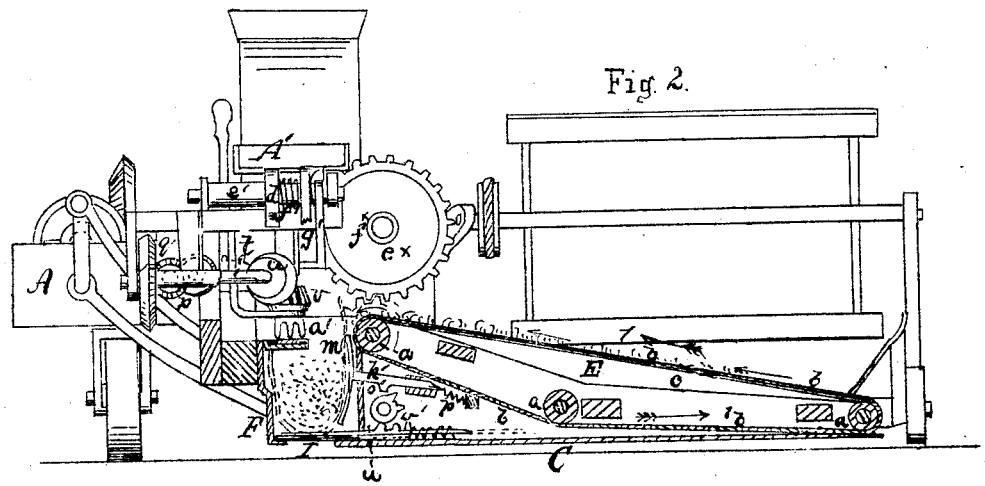
Figure 4:
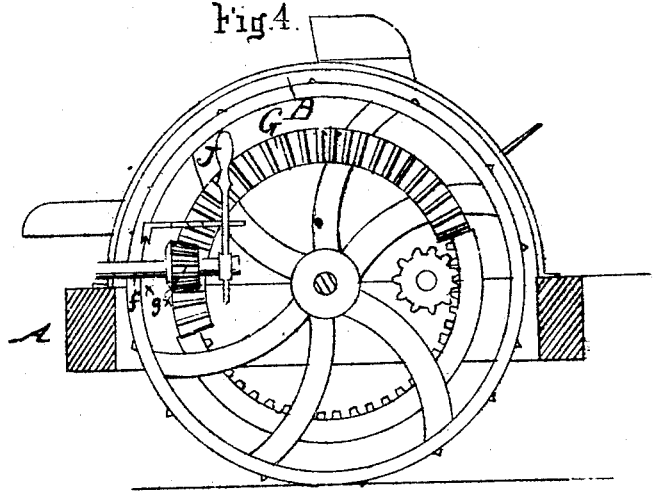

Figure 1 is a vertical section of a portion of my improvement, taken in the line $xx$, Fig. 3. Fig. 2 is a vertical section of the same, taken in the line $yy$, Fig. 3. Fig. 3 is a plan or top view of the same, the driving-wheel being bisected horizontally. Fig. 4 is a vertical section of a portion of the same, taken in the line $zz$, Fig. 3.

Similar letters of reference indicate corresponding parts in the several figures.

This invention consists in the employment or use of an intermittingly-moving apron, (or other raking or conveying device,) grain-receptacle, certain mechanism for twisting the bands around the grain in the receptacle, and a discharging device; the whole being arranged and attached to the machine as hereinafter fully shown and described, whereby the grain, as fast as it is cut by the machine, may be gathered into gavels of requisite size, firmly bound, and discharged upon the ground.

To enable those skilled in the art to fully understand and construct my invention, I will proceed to describe it.

A represents the main frame of the machine, which frame may be of rectangular form, with the driving-wheel B fitted within it. C is a frame which is attached to the main frame A. The frame C has the sickle D attached to its front end, said sickle being of the double or single reciprocating kind. On the frame C an endless apron, E, is placed, said apron passing around rollers $a$, and being slightly elevated at its inner part, adjoining the main frame A. The apron C may be constructed of slats $b$, (metal or wood,) attached to straps $c$, which pass around the rollers $a$.

At the inner end of the frame C a box, F, is placed, said box being below the apron, as shown in Fig. 2. The upper roller $a$ of the apron has its shaft $d$ projecting forward, and a pinion, $e$, is placed upon it, said pinion gearing into a pinion, $e^x$, on a shaft, $f^x$, which has a bevel-wheel, $g^x$, on its front end. On the side of the driving-wheel B a semicircular geared rim, G, is attached, concentric with the wheel B. (See Fig. 4.) As the machine is drawn along, the rim G will gear into the pinion $e^x$, and said pinion will be rotated in one-half of the time occupied by each revolution of wheel B, for the rim G is only a semicircle. Consequently the apron E will have an intermittent motion. The apron moves in the direction indicated by arrow 1.

The sickle D is operated from the driving-wheel B by means of a crank-shaft, $f$, and shaft $g$, connected by gearing $h$, said shafts being rotated by a geared rim, $i$, attached to the driving-wheel. (See Fig. 3.)

To the driving-wheel B a segment-gear, $j$, is attached, said gear rotating intermittently a pinion, $k$, which is attached to a shaft, $l$. The back end of shaft $l$ has a bevel-pinion, $m$, on it, and this pinion gears into a pinion, $n$, which is placed on a shaft, $o$. This shaft $o$ has a pinion, $p$, on its back end, said pinion $p$ gearing into a pinion, $q$, on a shaft, $r$, and also into a pinion, $s$, on an oblique shaft, $t$, the opposite end of shaft $t$ having a pinion, $u$, on it, which pinion gears into a corresponding one, $v$, on a vertical shaft, $w$, which has a fork, $a'$, at its lower end. (See Figs. 1 and 2.) The shaft $r$ has a wheel, $b'$, on the end opposite to the end where the pinion $q$ is placed, said wheel being provided on its periphery with two teeth or cogs, 1 2. (See Figs. 1 and 3.) A segment-gear, $c'$, is attached to one side of the wheel $b'$, which gears into a part pinion, $d'$, on a shaft, $e'$, the shaft $e'$ having a spiral spring, $f$, around it. To one end of the shaft $e'$ a rod, $g'$, is attached, the lower end of which is bent at a right angle with its other portion, as shown clearly in Figs. 2 and 3.

H is a slide-bar, which is fitted in a proper guide, $h'$, attached to one side of the box F. This slide has two teeth, $i'$ $i'$, attached to it, and a spring, $j'$, is also attached to the slide H. Through the side of the box F a bar, $k'$, passes, and this bar has a forked plate, $m'$ attached to it. The bar $k'$ has a projection, $o'$, formed on its under side, and a spring, $p'$, connected to it, as shown in Fig. 2.

The pinion $m$ on the back end of the shaft $l$ gears into a pinion, $q'$, which is attached to the upper end of an inclined shaft, $r'$, the lower end of said shaft having a pinion, $s'$, on it, which pinion gears into a corresponding pinion, $t'$, on a shaft, $u'$, underneath the apron E, said shaft $u'$ having a part pinion, $v'$, on it.

I is the bottom of the box F. This bottom is allowed to slide in and out, and a rack, $w'$, is attached to it, into which the part pinion $v'$ intermittingly gears.

The shaft $l$ is allowed to slide in its bearings, so that by means of a lever, J, the pinion $k$ may be thrown in and out of gear with the segment-gear $j$. The shafts $f^{\times}$ $g$ have also levers K L connected to them, and are arranged in the same way for the same purpose.

The operation is as follows: As the machine is drawn along, the grain cut by the sickle D falls on the apron E, the usual reel, D′, being employed, and as the apron E moves intermittingly, the cut grain will be deposited in gavels in the box F. In case a very light crop of grain is being cut, the movement of the apron may be retarded, so that sufficient-sized sheaves may be formed, by the driver throwing the pinion $g^{\times}$ out of gear with the geared rim G, and throwing it in gear with said rim at the desired time. An attendant is seated on a seat, A′, just over the box F, and places a band, $a^{\times}$, in the box F, just previous to the advent of the grain therein. One end of this band is attached to the fork $m'$, and the other is over at the opposite side of the box F, so that the gavel may be dropped into the band. At this point the segment-gear $j$ rotates the pinion $k$, and the fork $a'$ is rotated through the medium of the gearing previously described, and the fork $m'$ is then forced up toward the fork $a'$, the latter twisting the two ends of the band, which, when twisted, are bent over, as shown in Fig. 1, by the rod $g'$, which is actuated at the proper time by the gearing described. As soon as the twisted ends are bent over, the slide-bar H is shoved forward, in consequence of the teeth 1 2 of the wheel $b'$ catching into the teeth $i'$ $i'$ of the slide-bar H, and said slide-bar, by this movement, tucks the twisted end under the band. The bottom I of the box F is then drawn back by the part pinion $v'$, and the bound sheaf drops upon the ground, the bottom I being forced back to its original position by the spring $p'$, and the slide-bar H forced back by the spring $j'$. The movements of the several parts, as above described, take place intermittingly during the time the pinion $k$ is in gear with the segment $j$, the binding device and the apron operating alternately.

Having thus described my invention, what I claim as new, and desire to secure by Letters Patent, is—

The grain box or receptacle F, revolving fork $a'$, sliding fork $m'$, rod $g'$, slide-bar H, and sliding bottom I, arranged to operate as herein described, and used in connection with any proper raking or conveying device, whereby the grain, as it is cut, is bound and discharged in sheaves from the machine.

GEORGE NOTMAN.

Witnesses:
JACOB V. MELL,
W. R. WILSON.